F. L. SESSIONS.
RACK RAIL LOCOMOTIVE.
APPLICATION FILED NOV. 3, 1910.
1,027,077.
Patented May 21, 1912.
2 SHEETS—SHEET 1.
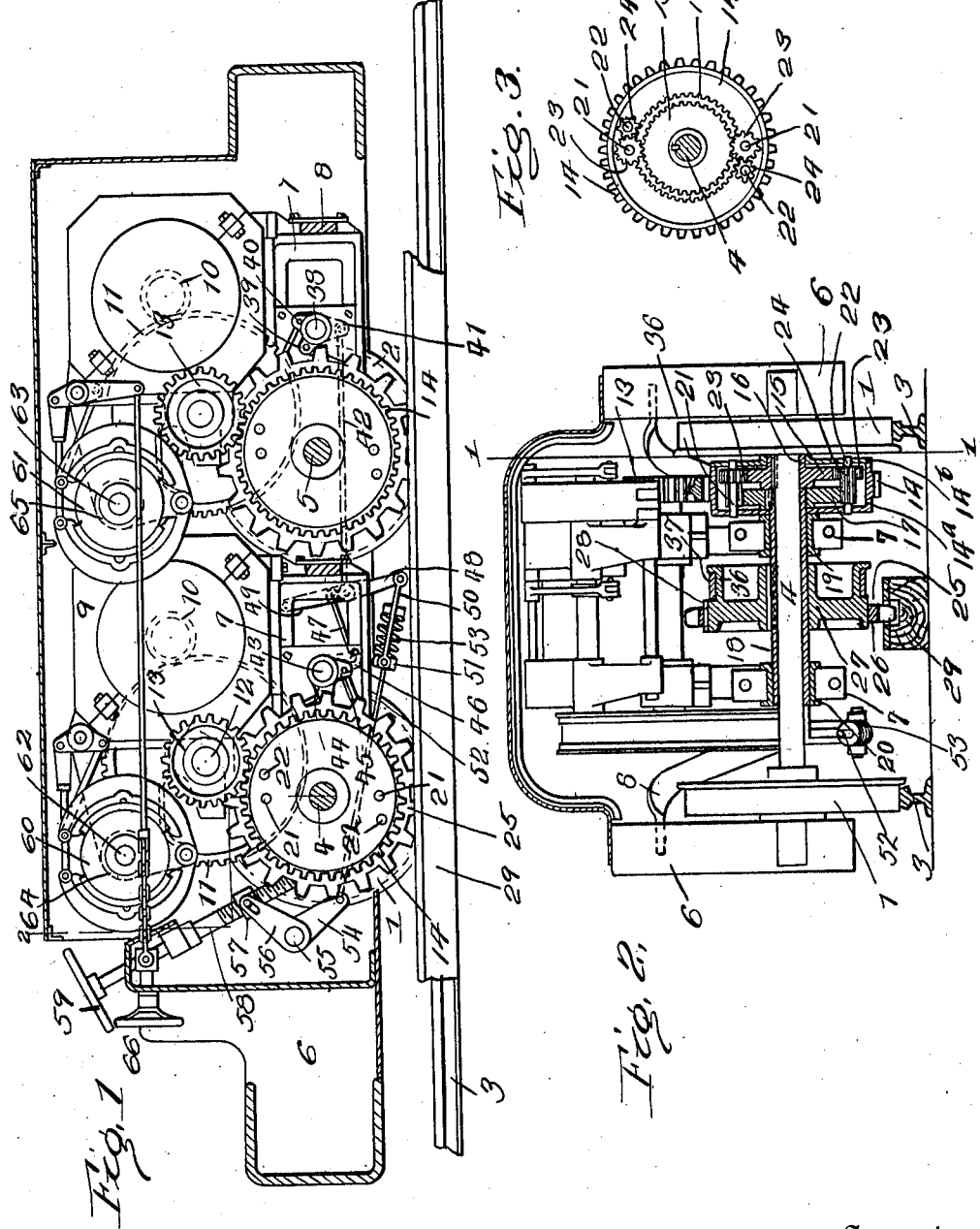
Witnesses
Inventor
F. L. Sessions
By H. H. Bliss
Attorney

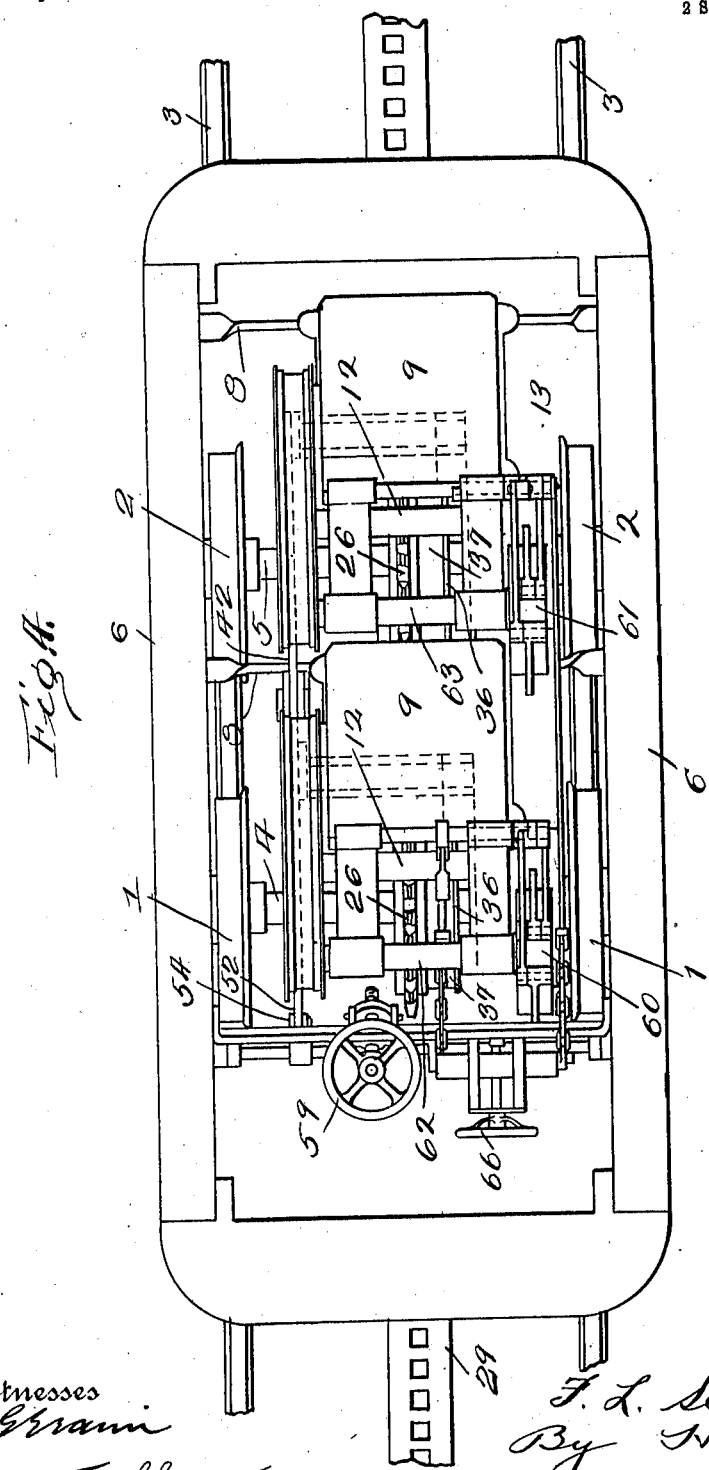

UNITED STATES PATENT OFFICE.

FRANK L. SESSIONS, OF COLUMBUS, OHIO, ASSIGNOR TO THE JEFFREY MANUFACTURING COMPANY, A CORPORATION OF OHIO.

RACK-RAIL LOCOMOTIVE.

1,027,077.  Specification of Letters Patent.  Patented May 21, 1912.

Application filed November 3, 1910. Serial No. 590,483.

*To all whom it may concern:*

Be it known that I, FRANK L. SESSIONS, a citizen of the United States, residing at Columbus, in the county of Franklin and State of Ohio, have invented certain new and useful Improvements in Rack-Rail Locomotives, of which the following is a specification, reference being had therein to the accompanying drawing.

This invention relates to locomotives which are provided with gear or sprocket wheels adapted to mesh with a suitable rack rail laid along the track between the ordinary traction rails.

The object of the invention is to provide a locomotive of this class in which power may be transmitted both to the rack or sprocket wheel and to the track wheels from a single motor without regard to the relative speeds of the rack and track wheels.

I am aware that it has been proposed to simultaneously drive the rack wheel and the track wheels at the same peripheral speed. This has been accomplished either by making the rack wheel of the same pitch diameter as the track wheel diameters, or by connecting the rack and track wheels to the motor by means of suitable speed changing gearing. Both of these methods, however, are objectionable as it is impossible to maintain in actual practice the conditions for which the locomotive is designed. For instance, when the rack and track wheels are made originally of the same diameter, the wear on the track wheels reduces them and causes slippage, which slippage still further increases the wear. On account of variations in elevation of the rack rail, the effective pitch diameter of the rack wheel is constantly changed, and the actual pitch of the rack itself varies somewhat from place to place. All of these irregularities and inaccuracies tend to prevent the even distribution of power between the two driving elements.

By my invention I provide a differential gear between the rack and track wheels by means of which power is transmitted to each of them regardless of any variations in the diameters, or in the effective pitch of the rack.

In the accompanying drawings I have shown my improvements applied to a locomotive similar, in many respects, to that shown and described in my pending application, Serial No. 393,147.

Of the drawings, Figure 1 is a cross sectional side elevation along the line 1—1 of Fig. 2. Fig. 2 is an end cross sectional elevation along the line 2—2 of Fig. 1. Fig. 3 is a view of the differential gearing with one side removed. Fig. 4 is a plan view.

Referring to the drawings, 1, 1 and 2, 2 are suitable track wheels resting on the track rails 3, 3, and secured to the axles 4 and 5. 6 is the main frame of the locomotive which is mounted in suitable bearings on the ends of the axles 4 and 5.

To each of the track wheels and axles is connected a rack wheel, a motor, a brake and suitable transmission gearing. This mechanism is the same for each, and it will, therefore, be sufficient to describe the mechanism connected to one axle, it being understood that the mechanism for the other is substantially identical.

7, 7 are motor supporting frames mounted at one end on the axle, and supported at the other end by means of the hammock bar 8 which has its ends secured to the main frame of the locomotive.

9 is the motor secured to the frame 7, 7, and having a driving pinion 10. This pinion meshes with the large gear 11 secured to the intermediate shaft 12 which is mounted in suitable brackets on the motor frame. At the other end of the shaft 12 is secured the pinion 13, which meshes with the gear 14. The gear 14 is preferably formed in the shape of a hollow cylinder and comprises the two parts 14ª and 14ᵇ. Any desired construction, however, may be used which provides a suitable support or frame for the gearing to be hereafter described. Within the cylinder 14 is located the spur gear 15 which is connected to the axle 4. The gear 15 is provided with a laterally extending flange or bushing 16 which forms a bearing for one wall of the cylinder 14.

17 is a spur gear similar to the gear 15 and similarly located within the cylinder 14, but at the opposite side. The gear 17 is connected to the sleeve or quill 18 which, in turn, is mounted upon the axle 4 so as to be free to rotate independently thereof. One wall of the cylinder 14 has a bearing on this sleeve. On the sleeve 18, by means of the bearing bushings 19 and 20, are mounted the motor supporting frames 7, 7, which have been before described.

Between the two parts 14ª and 14ᵇ of the cylinder 14 are located the pins 21 and 22 which are arranged in pairs. In the drawings, for purposes of illustration, I have shown two pairs of pins, but it will be understood that any desired number may be used. On each of the pins 21 there is rotatably mounted a pinion 23 which meshes with the gear 15. On each of the pins 22 there is rotatably mounted a pinion 24 which meshes with the gear 17. The pins 21 and 22 are so located in relation to each other that the pinions 23 and 24 of each pair will mesh. One convenient means of bringing about this meshing of the pinions is to extend one of them as, for instance, 24, so that its face will be of sufficient length to mesh with both the gear 17 and the pinion 23.

25 is a rack wheel and comprises an outer toothed ring 26 and an inner hub 27 which is connected to the sleeve 18. The outer ring is slidable on the hub 27 in a direction parallel to the axle but is secured to the hub by means of the keys 28 to rotate with it. This rack wheel is of a diameter somewhat smaller than that of the track wheels so that in passing over turn-outs and cross-overs the teeth of the rack wheel will clear the track rails.

29 is the rack rail laid preferably midway between the track rails and at a slightly higher elevation to mesh properly with the rack wheel.

36 is a brake drum secured preferably to the hub 27.

37 is a brake strap engaging with the drum 36.

The mechanism for tightening the brake straps on the drums of the two axles is shown in Fig. 1. 38 is a rock shaft mounted in suitable bearing brackets on the motor supporting frame. This rock shaft is provided with arms 39 and 40 to which are attached the ends of the brake strap. 41 is a rocking lever attached to the rock shaft. To this rocking lever is connected a rod 42. A similar rock shaft 43 with arms 44 and 45, and a rocking lever 46, is provided for the other brake strap. To the rocking lever 46 is connected the rod 47. The two rods 42 and 47 are connected to adjacent parts of a floating lever 48 which is supported by means of a link 49. To the lower end of the floating lever 48 is connected the rod 50. At its other end this rod 50 is pivotally attached to the yoke 51 which is slidable on the rod 52. A coil spring 53 limits the motion of the yoke 51 and serves to transmit force from the rod 52 to the rod 50. At its other end the rod 52 is connected to an arm 54 on the shaft 55. This shaft 55 is provided with a second arm 56 which engages with the threaded collar 57. The collar 57 engages with the screw 58 which carries the hand wheel 59. When it is desired to tighten the brake straps 37, the hand wheel 59 is turned in a direction to lower the collar 57. From this collar, by means of the arm 56, the shaft 55, the arm 54, and the links 52 and 50, force is transmitted to the floating lever 48. On account of the movement of this lever, the rods 42 and 47 are tensioned, and the shafts 38 and 43 are rocked, the movement of the arms attached thereto tightening the brake straps.

60 and 61 are brake mechanisms connected to the shafts 62 and 63 which are driven by means of the pinions 64 and 65, meshing with the gears 11. These brakes are operated by means of the hand wheel 66 through suitable levers. The structural features of these brakes form no part of my present invention, and need not, therefore, be described in detail.

When the locomotive is in operation, power is transmitted from the motors through the pinions 10 and the gears 11 to the shafts 12. From each of the shafts 12, it is transmitted through the gear 13 to the gear 14. As the gear 14 is rotated, it carries with it the pinions 23 and 24. The natural tendency of these pinions is to roll both in the same direction on the gears 15 and 17 with which they are in mesh. This tendency of the pinions to roll is counteracted by the intermeshing of the pinions themselves, which prevents their rolling or rotating in the same direction. As a result of this coöperation of the pinions, power is transmitted to the gears 15 and 17. It will be noted that the force transmitted to the circumference of each of these gears is equal, but on account of the greater diameter of the gear 17, the power transmitted to it will be greater than the power transmitted to the gear 15 in proportion of the diameters of the gears. As a result of this unequalized differential gearing, a greater amount of power is transmitted to the rack wheel than to the axle. Any desired proportion of the power may be transmitted to the rack wheel by providing gears 15 and 17 of suitable relative diameters. On account of its smaller diameter, the rack wheel will rotate somewhat faster than the track wheels. But the differential gearing will compensate for this difference in speed, and also for any other speed difference due to inaccuracies in the wheels or the road bed.

A locomotive having a differential between the rack and track wheels is limited in its effort by the maximum tractive force of the friction wheels. When the point is reached at which the friction wheels commence to slip, no further power can be applied for the propelling of the locomotive. If a simple differential, such as is common in automobile construction, were to be used between the rack and track wheels, then the total tractive effort of the locomotive would be limited to twice the tractive force of the traction wheels. By the use of an unequalized differential, such as I have shown and described, the total tractive force may be made any desired number of times greater than that of the track wheels.

It is frequently desirable to use locomotives of this type on stretches of track where no rack rail is provided. In order that this may be done, I provide the braking mechanism for the rack wheels, which has been fully described. When a portion of the track is reached on which there is no rack rail, then the brakes are set and the rack wheel locked against movement. All the power is then transmitted to the axles, the gear wheel 17 serving merely as an abutment for the pinions 24. It will be noted that with the motor running at the same speed as before, the track wheels will be rotated at a greater speed than previously. This change of speed is desirable as it permits the motors, when running at their normal speed, to drive the locomotive at a higher speed when on comparatively level stretches of track where less tractive effort is required. In other words, this construction permits the motors to exert their full power without material change of speed to either propel the locomotive up a grade at a slow speed, or on a level at a high speed.

What I claim is:—

1. In a locomotive, the combination of a frame, axles on which the frame is mounted, track wheels on the axles, a rack wheel rotatable independently of the track wheels, a motor, and transmission mechanism comprising a differential gear between the motor and the rack and track wheels, substantially as set forth.

2. In a locomotive, the combination of a frame, axles on which the frame is mounted, track wheels secured to the axles, a rack wheel in axial alinement with one of the axles and rotatable independently thereof, a differential gear between the rack wheel and the axle, a motor, and transmission gearing between the motor and the driving element of the differential gear, substantially as set forth.

3. In a locomotive, the combination of track wheels and a rack wheel rotatable independently of the track wheels, differential gearing between the said rack and track wheels, and a motor connected to the driving element of the differential gearing, substantially as set forth.

4. In a locomotive, the combination of a frame, track wheels supporting the frame, a rack wheel rotatable independently of the track wheels and of smaller diameter, a differential gear connected to the rack wheel and to the track wheels, and a motor connected to the driving element of the differential gear.

5. In a locomotive, the combination of a main frame, axles on which the main frame is supported, track wheels secured to the axle, a driving frame rotatable on the axle, driving pinions loosely mounted on the driving frame, a gear secured to the axle and meshing with the pinions, a rack wheel rotatable on the axle, a gear connected to the rack wheel and also meshing with the pinions, a motor, and transmission gearing between the motor and the driving frame, substantially as set forth.

6. In a locomotive, the combination of a main frame, axles on which the main frame is supported, track wheels secured to the axle, a driving frame rotatable on the axle, a motor, gearing between the motor and the driving frame, pinions loosely mounted on the driving frame, a rack wheel rotatable about the axle, a gear secured to the rack wheel and meshing with the pinions, and a second gear secured to the axle and meshing with the pinions, substantially as set forth.

7. In a locomotive, the combination of a main frame, track wheels supporting the main frame, a rack wheel rotatable independently of the track wheels, a differential gear between the rack and track wheels, a motor, a gearing between the motor and the driving element of the differential gear, and a device for retarding the motion of the rack wheel, substantially as set forth.

8. In a locomotive, the combination of track wheels, a rack wheel rotatable independently thereof, means for retarding the rotation of the rack wheel, a motor, power transmission devices between the motor and the rack and track wheels comprising a mechanism whereby the rotative speed of the track wheels is increased as that of the rack wheel is decreased by the retarding means, substantially as set forth.

9. In a locomotive, the combination of a main frame, axles on which the main frame is supported, track wheels secured to the axles, a driving frame journaled on one of the axles, loosely mounted driving pinions on the frame, a rack wheel rotatable about the axle, a gear connected to the rack wheel and meshing with the driving pinions, a brake drum connected to the rack wheel, a brake strap for engaging the drum, a gear wheel secured to the axle and meshing with the driving pinions, a motor, and transmission gearing between the motor and the driving frame, substantially as set forth.

10. In a locomotive, the combination of a main frame, axles and track wheels upon which the main frame is supported, a rack wheel rotatable independently of the track wheels, differential gearing between the rack and track wheels, a motor connected to the driving element of the differential gear, and a brake connected to said driving element, substantially as set forth.

11. In a locomotive, the combination of a frame, axles and track wheels on which the frame is mounted, a rack wheel rotatable independently of the track wheels, a differential gear between the rack and track wheels, and a brake connected to the driving element of the said differential gear, substantially as set forth.

12. In a locomotive, the combination of a frame, axles and track wheels on which the frame is mounted, a rack wheel independently rotatable with respect to the track wheels, a braking mechanism secured to the rack wheel, differential gearing between the rack and track wheels, and a brake connected to the driving element of the said differential, substantially as set forth.

13. In a locomotive, the combination of a frame, axles and track wheels on which the frame is mounted, a rack wheel independently rotatable with respect to the track wheels, gearing between the rack and track wheels, the said gearing having an element which is non-synchronously rotatable with respect to the rack and track wheels, and two braking elements, one connected directly to the rack wheel and the other connected to the non-synchronously rotatable element of gearing to retard both the rack and the track wheels, substantially as set forth.

14. In a locomotive, the combination of a frame, axles and track wheels on which the frame is supported, a rack wheel mounted to rotate independently of the track wheels, a motor, gearing between the motor and the rack and track wheels comprising an unequalized differential mechanism adapted to transmit more power to the rack wheel than to the track wheels, substantially as set forth.

15. In a locomotive, the combination of a frame, axles and track wheels on which the frame is supported, a rack wheel independently rotatable with respect to the track wheels, a brake, transmission mechanism between the brake and the rack and track wheels comprising an unequalized differential gear adapted to transmit a greater retarding force to the rack wheel than to the track wheels, substantially as set forth.

16. In a locomotive, the combination of a main frame, axles and track wheels on which the main frame is mounted, a driving frame journaled on one of the axles, a motor, gearing between the motor and the driving frame, pinions loosely mounted on the driving frame, a gear secured to the axle and meshing with the pinions, a rack wheel rotatable about the axle, and a gear connected to the rack wheel and meshing with the pinions, said gear being of larger diameter than the gear secured to the axle, substantially as set forth.

17. In a locomotive, the combination of a frame, axles on which the frame is mounted, track wheels on the axles, a rack wheel mounted on said axle and rotatable independently thereof, a rotating driving element independently rotatable on said axle, a motor, gearing between the motor and the driving element, a pair of intermeshing pinions mounted on said driving element, a gear connected to the axle and meshing with one of said pinions, and a gear connected to the rack wheel and meshing with the other of said pinions, substantially as set forth.

18. In a locomotive, the combination of a main frame, axles and track wheels on which the frame is mounted, a rack wheel mounted on the axle and independently rotatable thereon, a gear connected to the rack wheel, a gear connected to the axle and of lesser diameter than the gear connected to the rack wheel, and a driving element comprising freely rotatable pinions which mesh with the gears connected to the rack wheel and the axle, substantially, as set forth.

19. In a locomotive, the combination of a main frame, axles and track wheels on which the main frame is supported, a rack wheel rotatable independently of the axle, two gears of different diameters, the larger connected to the rack wheel and the smaller connected to the axle, and differential driving gearing meshing with the two gears, substantially as set forth.

20. In a locomotive the combination of a main frame, axles and track wheels on which the frame is mounted, a rack wheel independently rotatable on the axle, a pair of adjacent gears, one connected to the rack wheel and the other to the axle, a cylinder rotatable on the axle and inclosing the said gears, a motor, gearing between the motor and the cylinder, and differential driving means connected to the cylinder and adapted to drive the gears substantially as set forth.

In testimony whereof I affix my signature in presence of two witnesses.

FRANK L. SESSIONS.

Witnesses:
E. P. SNIVELY,
ETHEL ELLIS.

Copies of this patent may be obtained for five cents each, by addressing the "Commissioner of Patents, Washington, D. C."